United States Patent
Branning et al.

(10) Patent No.: US 8,703,933 B2
(45) Date of Patent: Apr. 22, 2014

(54) SINGLE-PHASE PREPARATION OF HYDROPHOBIC STARCH PRODUCT

(75) Inventors: Shawn R. Branning, Nazareth, PA (US); Tracy M. John, Somerset, NJ (US); Kamlesh K. Shah, Monmouth Junction, NJ (US)

(73) Assignee: Corn Products Development, Inc, West Chester, IL (US)

( * ) Notice: Subject to any disclaimer, the term of this patent is extended or adjusted under 35 U.S.C. 154(b) by 113 days.

(21) Appl. No.: 13/345,237

(22) Filed: Jan. 6, 2012

(65) Prior Publication Data

US 2013/0178615 A1 Jul. 11, 2013

(51) Int. Cl.
*C08B 31/00* (2006.01)
*C08B 33/00* (2006.01)
*C08B 35/00* (2006.01)

(52) U.S. Cl.
USPC .......................................... 536/102

(58) Field of Classification Search
None
See application file for complete search history.

(56) References Cited

U.S. PATENT DOCUMENTS

| | | | |
|---|---|---|---|
| 2,961,339 A | 11/1960 | Wolff | |
| 3,071,492 A | 1/1963 | Satterly | |
| 4,016,117 A | 4/1977 | Griffin | |
| 4,021,338 A | 5/1977 | Harkin | |
| 4,125,495 A | 11/1978 | Griffin | |
| 4,235,965 A * | 11/1980 | Walon | 435/95 |
| 5,672,699 A | 9/1997 | Billmers et al. | |
| 7,375,214 B2 | 5/2008 | Lewis | |
| 2006/0189801 A1 * | 8/2006 | Lewis | 536/102 |
| 2008/0194809 A1 | 8/2008 | Lewis | |

FOREIGN PATENT DOCUMENTS

CA 726667 1/1986

* cited by examiner

*Primary Examiner* — Layla Bland
(74) *Attorney, Agent, or Firm* — Karen G. Kaiser

(57) ABSTRACT

A single phase preparation of free flowing, hydrophobic starches which comprises a starch treated with a siliconate and an acid in a single phase process, is described herein.

11 Claims, 1 Drawing Sheet

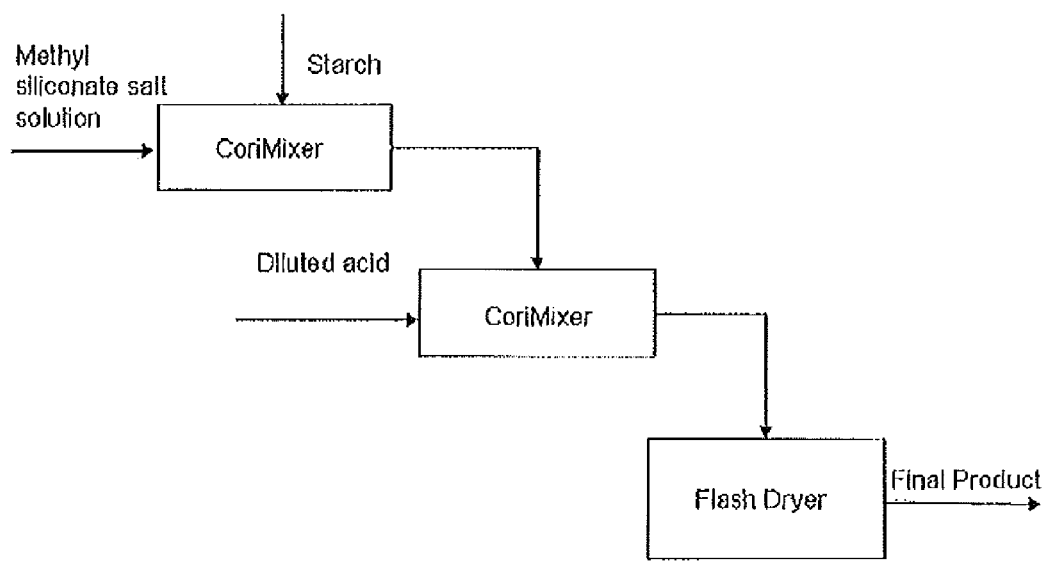

SINGLE-PHASE PREPARATION OF HYDROPHOBIC STARCH PRODUCT

BACKGROUND OF THE INVENTION

Prior attempts to treat starch in aqueous mixture processes with siliconate salts to develop water repellency (hydrophobicity) have resulted in undesirable properties and/or commercial disadvantages.

The following embodiments are presented to further illustrate and explain the present invention and should not be taken as limiting in any regard. All percents used are on a weight/weight basis unless otherwise specified.

1. A method comprising the steps of:
    mixing a siliconate solution and a starch to form a siliconate solution/starch mixture,
        wherein the siliconate solution comprises a siliconate,
        wherein the siliconate percentage of the siliconate solution/starch mixture is at least 0.5%;
        wherein the total moisture of the siliconate solution/starch mixture is at least 5% and not greater than 50%; and
    sufficiently mixing the mixture to result in a hydrophobic starch mixture.
2. The method of embodiment 1, further comprising mixing water with the siliconate solution and the starch to form a siliconate solution/starch mixture.
3. The method of embodiment 1 or 2, wherein the total moisture of the siliconate solution/starch mixture is at least 10% and not greater than 30%.
4. The method of any one of embodiments 1-3, further comprising the step of drying the hydrophobic starch mixture to result in a dried hydrophobic starch with a residual moisture content of 0-18% (w/w).
5. The method of embodiment 4, wherein the residual moisture content is from 7 to 14% (w/w).
6. The method of any one of embodiments 1-5, wherein the hydrophobic starch mixture exhibits a hydrophobicity of no more than 3 ml as assessed by the following test: add 75 ml of water to a Goetz type centrifuge tube; add 5 g of the hydrophobic starch mixture; invert the centrifuge tube 10 times without causing splashing, where "invert" is intended to mean turning the tube upside down and then back to original position over a period of at least three seconds; allow the centrifuge tube to sit for 30 minutes; slowly invert the centrifuge tube 10 more times without splashing; allow the centrifuge tube to sit another 30 minutes; and record the volume of settled starch in the centrifuge tube.
7. The method of embodiment 6, wherein the dried hydrophobic starch exhibits a hydrophobicity of no more than 0.8 ml.
8. The method of any one of embodiments 1-7, wherein the siliconate solution is comprised of a methyl siliconate salt.
9. The method of any one of embodiments 1-8, wherein the hydrophobic starch mixture is free flowing.
10. A product prepared in accordance with the method of any one of embodiments 1-9.
11. A method comprising the steps of:
    Mixing a siliconate solution and a starch to form a siliconate solution/starch mixture,
        wherein the siliconate solution comprises a siliconate,
        wherein the siliconate percentage of the siliconate solution/starch mixture is at least 0.5%;
        wherein the total moisture of the siliconate solution/starch mixture is at least 5% and not greater than 50%; and
    sufficiently mixing the mixture to result in a free-flowing starch mixture.
12. A product prepared in accordance with the method of embodiment 11.
13. The method of embodiment 9 or 11, wherein the resultant starch mixture has a starch pile diameter of at least 7.0 cm when tested as set forth in Example 4.

BRIEF DESCRIPTION OF THE SEVERAL VIEWS OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIG. 1 depicts a process flow for an embodiment of the process of the present invention.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Unless otherwise specified, all percentages expressed herein are weight/weight.

Units in this patent application are generally presented in English units, followed (in parentheses) by a conversion of the English units to SI units. To the extent that the parenthetical SI units represent a number inconsistent or erroneously converted from the English units, the English units should be read as accurate.

For the purposes of describing and claiming the present invention, the following terms are defined:

The term "free flowing" means: a property of a product tested in accordance with Example 4 of the instant application. A product is considered free flowing when it that has a starch pile diameter of at least 7.0 cm when tested as set forth in Example 4.

The term "hydrophobic" means: a property of a product tested in accordance with Example 5 of the instant application. A product is considered hydrophobic when it has a volume reading of no more than 1.0 ml when tested as set forth in Example 5.

The term "residual moisture content" means: a percentage of total mass of a material attributable to moisture weight loss under heating, and is assessed via a "loss-on-drying" method by utilizing a CSC Mechanical Moisture Balance. Approximately 5 grams of starch (as is) is added to the tray. The temperature is set to 95° C. At the end of the process, the moisture balance provides a readout of the residual moisture of the sample.

The term "siliconate" means: organosiliconates such as alkyl siliconates and phenyl siliconates, and salts thereof, including, but not limited to, sodium and potassium salts. Alkali metal alkyl siliconates include those defined by the general formula:

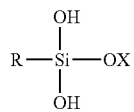

where R is an alkyl group containing 1 or more carbons and X is an alkali metal.

The term "siliconate solution" means: a siliconate dissolved in a solvent, and may optionally include additional components, for example, caustic agents.

The term "siliconate addition PSI" means: the pressure under which a siliconate solution is added to a starch in an embodiment of this invention.

The term "siliconate ratio" means: the ratio of siliconate solution to additional water (where the additional water is added to the siliconate solution and/or separately added to the starch of the instant invention), expressed in a weight/weight basis.

The term "siliconate percentage" means: The amount of siliconate to starch calculated on a weight/weight basis.

The term "siliconate solution percentage" means: The weight/weight ratio of siliconate in a siliconate solution. The siliconate solution is comprised of a siliconate in a solvent and may be further comprised of, for example, a caustic agent.

The term "single phase" means: a single phase, high solids, powdered mixture, as compared to a "slurry" consisting of two phases, i.e., a water phase and a starch phase.

The term "starch" means: starch in its natural or native form as well as also referring to starch modified by physical, chemical, enzymatic processes, and further includes the equilibrium moisture of the starch.

The term "total moisture" as used herein, is intended to mean the moisture of the starch as well as added moisture. Thus, for example, if the starch is at 10% moisture and 10 g water is added to 90 g starch, the total moisture would be 19%.

Suitable materials for the invention may be derived from any native source, and in one embodiment, a starch. A native source as used herein, is one as it is found in nature. Also suitable are starches derived from a plant obtained by standard breeding techniques including crossbreeding, translocation, inversion, transformation or any other method of gene or chromosome engineering to include variations thereof which are typically referred to as genetically modified organisms (GMO). Starches derived from a plant grown from artificial mutations and variations of the above generic composition, which may be produced by known standard methods of mutation breeding, are also suitable herein.

Typical sources for the starches are cereals (grains), seeds, tubers, roots, legumes and fruits. The native source can be corn (maize), pea, potato, sweet potato, banana, barley, wheat, rice, oat, sago, amaranth, tapioca (cassava), arrowroot, canna, and sorghum as well as waxy or high amylose varieties thereof. The invention embodied within relates to all starches regardless of amylase content and is intended to include all starch sources, including those which are natural, genetically altered or obtained from hybrid breeding. In one embodiment, the starch is a tapioca starch and in another embodiment the starch is a dent corn starch.

In one embodiment, the starch is modified by any number of possible treatments, either before, during or after the starch is mixed with siliconate solution.

In one embodiment of the present invention, starch is modified by conversion, either before, during or after the starch is mixed with siliconate solution.

In another embodiment of the present invention, starch is chemically modified, either before, during or after the starch is mixed with siliconate solution. Chemically modified starches are intended to include, without limitation, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch.

In another embodiment of the present invention, starch is physically modified, either before, during or after the starch is mixed with siliconate solution. Physically modified starches, such as thermally-inhibited starches, may also be suitable for use herein. Physically modified starches is also intended to include fractionated starches in which there is a higher proportion of amylose and starches which have been modified through grinding or shear. Physical modification includes, but is not limited to, thermal inhibition, agglomeration, and manipulation of starch particle size or morphology.

In another embodiment of the present invention, starch is enzymatically modified, either before, during or after the starch is mixed with siliconate solution.

Any starch or starch blend having suitable properties for use herein may be purified, either before or after any modification, by any method known in the art to remove starch off flavors, odors, or colors that are native to the starch or created during processing. The starch may be purified to remove impurities, by-products, off-flavors and colors by methods known in the art including without limitation by washing, dialysis, filtration, ion exchange processes, steam stripping, bleaching such as by chlorites, enzyme modification, and/or centrifugation. Such purification may be done at any time in the process.

Suitable materials may also include any suitable flour or appropriate particulate or granular biologically based material which may be sufficiently mixed with a siliconate solution to yield the present invention. In one embodiment, the suitable material is corn cob powder.

Siliconates include organosiliconates such as alkyl siliconates and phenyl siliconates, and salts thereof. In one embodiment, salts include sodium and potassium salts. Alkali metal alkyl siliconates include those defined by the general formula:

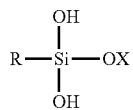

where R is an alkyl group containing 1 or more carbons and X is an alkali metal. In one embodiment, alkali metal alkyl siliconate is sodium methylsiliconate, where R is a methyl group and X is sodium. Exemplary species of alkali metal organosiliconates include sodium methylsiliconate, sodium ethylsiliconate, sodium propylsiliconate, potassium methylsiliconate, potassium ethylsiliconate and potassium propylsiliconate.

In another embodiment, sodium or potassium salts of methyl siliconate (for example and without limitation, XIAMETER® OFS-0772 Siliconate or XIAMETER® OFS-0777 Siliconate) are utilized.

Suitable acids include hydrogen-donating acids, for example, hydrochloric, sulfuric, nitric, phosphoric, and acetic acids. In one embodiment, the acid is hydrochloric acid.

In one embodiment, the sufficiently mixing aspect of the method of the present invention is carried out utilizing a CoriMix® apparatus (Lödige Process Technology, Paderborn, Germany www.loedige.de) made up of the mixer and the feeder. The CoriMix® apparatus has the ability to mix liquid with dry starch; that is, to add liquid chemical reagents such as acid and/or water to adjust moisture and/or pH. The feeder hopper can hold a maximum of about 100 lbs. (45.35 kg.) of dry starch and has the ability to discharge about 210 lbs. (95.25 kg.) of the dry starch into the mixer in an hour at a maximum speed. There is also a liquid addition tank on the side of the mixer and the feeder.

In one embodiment, the speed for the CoriMix® is any speed that will result in the sufficient mixing of the starch and siliconate solution to result in a hydrophobic starch.

In another embodiment, the speed for the CoriMix® is about 3000 RPM.

In one embodiment, prior to the addition of siliconate, siliconate solution, water, and/or acid to the starch, the CoriMix® and starch feed are turned on.

In another embodiment, any combination of order of addition, batch size, and mixing apparatus may be utilized so long as the result is sufficient mixing of the starch and siliconate solution to result in a hydrophobic starch.

The siliconate solution is added to a starch to form a mixture. The siliconate solution can be combined with the starch by itself or in combination with an acid and/or water. In one embodiment, the siliconate solution and acid are added to the starch. In another embodiment, the siliconate solution and water are added to the starch. In yet another embodiment, the siliconate solution and water are added to the starch and then, after sufficient mixing, acid is added. In still another embodiment, the siliconate solution, water and acid are mixed and then added to the starch.

In one embodiment, the siliconate solution is XIAMETER® OFS-0772 SILICONATE or XIAMETER® OFS-0777 SILICONATE, commercially available from the Dow Corning Corporation (Midland, Mich.), which may be provided at a pH of approximately 13.

The siliconate may be suspended in any suitable solvent to form a siliconate solution. Suitable solvents include, but are not limited to, water, caustic agents, and a combination of water and caustic agents.

In one embodiment, the amount of siliconate in the siliconate solution itself may be varied.

In one embodiment, the siliconate solution has a siliconate solution percentage of about 32% Sodium Methyl Siliconate or Potassium Methyl Siliconate (optionally greater than about 28% siliconate or potassium methyl siliconate), with up to 0.9% residual methanol, less than or equal to 3% sodium chloride and the remainder water.

The siliconate percentage may be varied and in one embodiment will be about 0.5% to about 5%, alternatively about 1.0% to about 2.0%, alternatively about 1.3% by weight.

Siliconate solution and water may both be combined with the starch to form a mixture. In one embodiment, the siliconate solution/starch mixture is a single phase, high solids, powdered mixture, as compared to a slurry consisting of two phases, i.e., a water phase and a starch phase.

In one embodiment, the total moisture is at least about 5%. In another embodiment, the total moisture is at least about 10%. In yet another embodiment, total moisture is at least about 15%. In one embodiment, the total moisture is no more than about 50%. In another embodiment, the total moisture is no more than about 45%. In yet another embodiment the total moisture is no more than about 40%. In still yet another embodiment, total moisture is no more than about 30%. In yet a further embodiment, total moisture is no more than about 20%. In one embodiment, the total moisture is approximately 19.5%.

The siliconate solution may also be introduced to the mixing chamber to form the mixture at varying pressures.

In another embodiment, the siliconate addition PSI of the inventive process is at least 3 (20.68 kPa).

In another embodiment, the siliconate addition PSI of the inventive process is at least 6 (41.37 kPa).

In another embodiment, the siliconate addition PSI of the inventive process is not greater than 15 (103.32 kPa).

In another embodiment, the siliconate addition PSI of the inventive process is between about 3 (20.68 kPa) and about 15 (103.32 kPa).

The starch may also be introduced to the mixing chamber to form the mixture at varying rates.

In another embodiment, the starch rate is about 3 lb. (1.36 kg.) 1 minute.

In another embodiment, the starch rate can be any rate in combination with order of addition, batch size, and mixing apparatus so long as the result is sufficient mixing of the starch and siliconate solution to result in a hydrophobic starch.

In another embodiment, the mixing time can be any duration in combination with order of addition, batch size, and mixing apparatus so long as the result is sufficient mixing of the starch and siliconate solution to result in a hydrophobic starch.

In one embodiment, the mixing process may proceed as a batch process.

In another embodiment, the mixing process may proceed as a continuous process.

In another embodiment, the mixing time can be any duration in either a batch or a continuous process so long as the result is sufficient mixing of the starch and siliconate solution to result in a hydrophobic starch.

Further, the starch is added to the CoriMix® in combination with siliconate added at a pressure effective to yield a sufficient mixing step that will result in a hydrophobic starch as described herein.

In one embodiment, the mixture comprising the starch and the siliconate is mixed for a suitable period to yield the hydrophobic starch of the instant invention.

In one embodiment, mixing of the starch/siliconate solution mixture progresses until the mixed starch reaches hydrophobicity, as assessed as described herein.

In one embodiment, mixing of the starch/siliconate solution mixture progresses until the mixed starch reaches a free-flowing state, as assessed as described herein.

In one embodiment, the mixed hydrophobic starch may have an alkaline pH; in one embodiment, a pH of approximately 10-12.

Acid adjustment of the siliconate solution may result in unwanted precipitation of the siliconate out of solution. Accordingly, if the siliconate solution is itself acid adjusted prior to combination of the acid-adjusted siliconate solution with the starch, such pH adjustment is undertaken (1) only to such extent that undesired precipitation of siliconate out of solution is avoided; and/or (2) immediately prior to combination of the acid-adjusted siliconate solution with the starch.

In one embodiment, the pH of the siliconate solution is adjusted prior to and/or as the siliconate solution is added to the starch to form a siliconate solution/starch mixture.

In another embodiment, the pH of the siliconate solution/starch mixture is adjusted during mixing.

In another embodiment, the pH of the hydrophobic siliconate solution/starch mixture is adjusted after mixing.

In another embodiment, the pH of the hydrophobic starch mixture is adjusted to a desired pH by adding an acid. The pH can be adjusted to a near-neutral pH (6-8). The pH can be adjusted to a pH greater than 4 and less than about 11.5, alternatively between about 5 and about 9, alternatively between about 6 and about 8, alternatively between about 6.5 and about 7.5, alternatively between about 6.8 and about 6.9, using an acid which dissociates sufficiently in water to produce the desired pH.

The starches, siliconates and acids can be used in the following methods to make hydrophobic starch compositions. A mixture of starch, siliconate solution and acid is prepared in any suitable manner. For example, starch can be prepared from any of a variety of native starches, and a siliconate solution, optionally with additional water, can be combined with the starch to form a hydrophobic starch mixture comprising the starch and the siliconate. The hydrophobic starch mixture can be adjusted to a desired near-neutral pH with the addition of a suitable amount of an acid. Alternatively, the hydrophobic starch mixture can be made by a method where a siliconate solution is combined with an acid in a solution before combining the solution with a starch, and optionally additional water, to form a hydrophobic starch mixture. In other words, a solution can be made from a siliconate and an acid, and the solution can be adjusted to a desired near-neutral pH with a suitable amount of acid, with the amount of acid added to the siliconate and optional water determining the pH of the subsequently-prepared hydrophobic starch mixture.

In one embodiment, the starches, siliconates and acids can be used in the following methods to make free-flowing starch compositions. A mixture of starch, siliconate solution and acid is prepared in any suitable manner. For example, starch can be prepared from any of a variety of native starches, and a siliconate solution, optionally with additional water, can be combined with the starch to form a free-flowing starch mixture comprising the starch and the siliconate. The free-flowing starch mixture can be adjusted to a desired near-neutral pH with the addition of a suitable amount of an acid. Alternatively, the free-flowing starch mixture can be made by a method where a siliconate solution is combined with an acid in a solution before combining the solution with a starch, and optionally additional water, to form a free-flowing starch mixture. In other words, a solution can be made from a siliconate and an acid, and the solution can be adjusted to a desired near-neutral pH with a suitable amount of acid, with the amount of acid added to the siliconate and optional water determining the pH of the subsequently-prepared free-flowing starch mixture.

In another embodiment, the hydrophobic starch mixture has an acidic pH.

In another embodiment, the hydrophobic starch mixture has a substantially neutral pH.

In another embodiment, the hydrophobic starch mixture has an alkaline pH.

In another embodiment, the hydrophobic starch mixture has an acidic pH on drying.

In another embodiment, the hydrophobic starch mixture has a substantially neutral pH on drying.

In another embodiment, the hydrophobic starch mixture has an alkaline pH on drying.

In one embodiment, the hydrophobic starch mixture is dried, either before or after pH adjustment. In one example, the starch solids may be anhydrous or substantially anhydrous (dried to a minimum moisture content of not greater than 1%); a residual moisture content of not greater than 2%; a residual moisture content of not greater than 3%; a residual moisture content of not greater than 4%; a residual moisture content of not greater than 5%; a residual moisture content of not greater than 6%; a residual moisture content of not greater than 7%; a residual moisture content of not greater than 8%; a residual moisture content of not greater than 9%; a residual moisture content of not greater than 10%; a residual moisture content of not greater than 11%; a residual moisture content of not greater than 12%; a residual moisture content of not greater than 13%; a residual moisture content of not greater than 14%; a residual moisture content of not greater than 15%; a residual moisture content of not greater than 16%; a residual moisture content of not greater than 17%; or a residual moisture content of not greater than 18%. The foregoing maximum moisture contents may be combined to form ranges.

In one embodiment, the residual moisture of the dried hydrophobic starch is between about 7 and about 14%.

In one embodiment, the dried hydrophobic starch mixture is free-flowing in accordance with the criteria set forth in Example 4. In another embodiment, the dried hydrophobic starch mixture is free flowing such that it forms a starch pile diameter of at least 7.0 cm. In another embodiment, the dried hydrophobic starch mixture is free flowing such that it forms a starch pile diameter of at least 7.5 cm. In another embodiment, the dried hydrophobic starch mixture is free flowing such that it forms a starch pile diameter of at least 8.0 cm. In another embodiment, the dried hydrophobic starch mixture is free flowing such that it forms a starch pile diameter of at least 9.0 cm. In another embodiment, the dried hydrophobic starch mixture is free flowing such that it forms a starch pile diameter of at least 10.0 cm.

In one embodiment, the hydrophobic starch mixture is hydrophobic in accordance with the criteria set forth in Example 5. In one embodiment, the hydrophobic starch mixture is hydrophobic such that no more than 3 ml of starch settles. to the bottom of the centrifuge tube. In another embodiment, the hydrophobic starch mixture is hydrophobic such that no more than 1.5 ml settles to the bottom of the centrifuge tube. In yet another embodiment, the hydrophobic starch mixture is hydrophobic such that no more than 0.8 ml settles. In one embodiment, the hydrophobic starch mixture is hydrophobic such that no more than 0.6 ml settles. In one embodiment, the hydrophobic starch mixture is hydrophobic such that no more than 0.4 ml settles.

EXAMPLES

The following examples are presented to further illustrate and explain the present invention and should not be taken as limiting in any regard. All percents used are on a weight/weight basis.

Example 1

Creation of a Hydrophobic Starch Mixture

This example illustrates an embodiment of the creation of a sufficiently mixed starch. In one embodiment, a CoriMix® is utilized to mix the corn and/or tapioca starches disclosed in Table 1 herein, or any other suitable starch or other suitable biologically based material. The CoriMix® is made up of two components, the mixer and the feeder. The mixer has a maximum speed of 3500 rpm and is controlled on the main panel view. It has the ability to mix materials and to adjust pH, moisture and acid treatment of the mixed materials. The feeder hopper can hold a maximum of 100 lbs. (45.36 kg) of dry starch and has the ability to discharge 210 lbs. (95.25 kg) of the dry starch into the mixer in an hour at a maximum speed. The feeder also has a liquid addition or shot tank, which may be utilized to add liquids, under pressure, into the mixer. The CoriMix® may be employed as follows:

Obtain a quantity of the base starch, and load the specified amount of base starch in the feed hopper.

Set the starch rate, designated as lbs./minute to be added from the feed hopper to the mixer.

Prepare the chemical reagents to be used for addition to the shot tank. In a chemical hood, weigh out 4.2 lbs. (1.90 kg.) of siliconate in 5 gallon (18.9 L) bucket. Add 8.4 lbs. (3.80 kg.) of tap water into the 5 gallon (18.9 L) bucket. Mix manually. Measure and record the pH of the siliconate solution.

Transfer material into a clean shot tank for the CoriMix® equipment. Close the reagent addition valve on the mixer, and set the liquid flow rate/psi by adjusting the air pressure of the tank. The maximum pressure of the shot tank is 60 psi (413.69 kPa). The pressure may vary from 4-35 psi (27.58-103.42 kPa) (approximately 0.15-0.51 lb/min. [0.07-0.23 kg/min.]) depending on the total weight of the reagent, starch addition rate, concentration of the acid, and desired pH of material. Overall the rates may be set to complete the siliconate addition on to 100 lbs (45.36 kg) of starch within 30 minutes, approximately. The pressure for the acid addition may be set based on the desired final product pH.

Turn on the main power switch and the feeder power switch.

Adjust the agitator speed to 3000 rpm. Once the speed is set, start the mixer. Set the starch flow rate on the CoriMix® for 3 lb (1.36 kg) 1 min. Start the starch control feeder and open the liquid control valve immediately. In one embodiment, a quantity of the starch added to the mixer via the starch control feeder may be mixed prior to adding the siliconate and/or acid from the shot tank. Take a sample of the starch/siliconate mixture during siliconate addition. Measure and record the pH of a slurry made with 20% starch obtained from the sample in water.

Check to see if the starch/siliconate sample withdrawn from the mixer is sufficiently mixed so as to be hydrophobic, as defined herein.

Once the addition of the siliconate and/or acid to the starch is complete, turn off the mixer and feeder. Flush the shot tank and addition line with water. Open the control valve and add tap water to the shot tank. Adjust pressure to 20 psi (137.90 kPa). Collect water from the nozzle into an empty container and dispose of accordingly.

Example 2 pH—Adjusting pH of the Hydrophobic Starch Mixture

Remove the hydrophobic and/or free flowing starch from the mixer and reload the batch or continuously processed hydrophobic starch into the feed hopper.

Set the starch rate, designated as lbs./minute to be added from the feed hopper to the mixer.

Prepare acid solution. In a hood, add 8 lbs. (3.63 kg.) of water into a suitable container. Add 1 lb (0.45 kg) of hydrochloric acid to the container. Mix manually. Transfer the dilute hydrochloric acid into a clean shot tank for the CoriMix® equipment. Close the reagent addition valve on the mixer. Set the liquid flow rate/psi by adjusting the air pressure of the tank.

Adjust the agitator speed to 3000 rpm. Once the speed is set, start the mixer. Start the feeder and open the liquid control valve immediately. Take a sample after 2 minutes and stop the feeder and mixer and close the liquid control valve. Measure the pH of a slurry made with 20% starch obtained from the sample. Adjust pressure as needed to target a pH of 5.5-7.5. Once pressure and starch rate are set, complete the pH adjustment with acid solution. Take sample of pH adjusted material. Create a slurry made with 20% starch obtained from the sample and measure the pH of the slurry. When the desired endpoint is reached and all hydrophobic starch has been pH adjusted, turn off the mixer.

Example 3

Ring-Drying the Hydrophobic and/or Free-Flowing Starch

In one embodiment, the following procedure is utilized to ring dry the free-flowing and/or hydrophobic starch to a residual moisture of, in one embodiment, 10-14%, utilizing a Barr-Rosin 276 Pilot Ring Dryer (Barr-Rosin Inc., Boisbriand, Quebec).

Turn the ring dryer on; start up unit and wait for unit to indicate that the startup mode is complete On the control panel:

Place Inlet controller in Auto and wait until temperature reaches set point

Place Outlet controller in Manual and set to same temperature as in inlet controller.

Place Inlet controller into Cascade mode.

Place Outlet controller back into Auto mode.

Set Outlet controller set point to desired temperature.

Fill the feed hopper of the ring dryer with hydrophobic and/or free-flowing starch.

Start ring dryer. Mixture will begin to feed into the dryer. Adjust the belt speed on the control panel to the desired run rate/inlet temperature. If the inlet temperature gets too high, the dryer will stop the feed.

Refill the feed hopper as needed.

Adjust outlet temperature set point to achieve the desired product moisture.

Empty the collection pot when it is full into an appropriate storage container.

After drying is completed, press the Stop button on the control panel to shutdown the unit.

Example 4

Assessing "Free-Flowing"

The "free-flowing" nature of the starch/siliconate mixture may be assessed, in one embodiment, as follows.

Obtain the following: (1) A glass plate with a smooth surface 30 cm×30 cm (for minimal resistance from friction); (2) A ruler to measure the diameter of the starch's flow distance; (3) A PVC tube with an inner diameter of 1 inch (2.54 cm.), length of 5 inches (12.7 cm.); (4) a 50 mL graduated cylinder.

Place tube vertically on top of the glass plate with one end resting firmly on top of the plate. Make sure that the tube is resting on the center of the plate.

Shake the container with the starch in it for a few seconds in order to avoid measuring starch packed more densely than normal. Measure 20 mL of sample into the graduated cylinder.

Carefully transfer the previously measured starch sample to the tube, avoiding an over accumulation of the starch on the sides of the tube. Tap the PVC tube and graduated cylinder while making sure not to move the tube itself, in order to make sure that the starch is on the bottom of the tube.

Gripping the outside of the tube, carefully and quickly lift the tube vertically, making sure to minimize lateral movement of the tube.

With a ruler, measure the diameter (in cm) of the resultant circular pile of starch from 4 different angles: top to bottom, left to right, top left to bottom right, and top right to bottom left.

Average all 4 measurements to obtain an average diameter measurement.

Starch that has sufficient free flowing properties if the pile diameter is 7 cm or greater if residual moisture content is 9-13%. Starches with lower equilibrium moisture will have a marginally larger diameter than starches with higher moisture.

Example 5

Assessing Hydrophobicity

The comparative water repellency (hydrophobicity) of starch powders can be determined quantitatively, in one embodiment, as follows:

Add 75 ml of water to a Goetz type centrifuge tube. Add 5 g of the product to be tested. Invert the centrifuge tube 10 times without causing splashing. "Invert" is intended to mean turning the tube upside down and then back to original position over a period of at least three seconds. Allow to sit for 30 minutes. Invert the centrifuge tube 10 more times without splashing. Allow to sit another 30 minutes and record the volume of settled particles.

A product treated with siliconate is considered hydrophobic with a volume reading of no more than 3 ml, preferably no more than 1 ml.

Example 6

Creation of a Hydrophobic Corn Starch (DAP-37 MELOJEL® Starch)

This example demonstrates the creation of a product of the present invention using MELOJEL® starch.

Obtain 100 lbs. (45.35 kg.) of the base starch, and load the specified amount of base starch in the feed hopper.

Set the starch rate, designated as 3.25 lbs. (1.47 kg.)/minute to be added from the feed hopper to the mixer.

Prepare the chemical reagents to be used for addition to the shot tank. In a chemical hood, weigh out 12.6 lbs. (5.71 kg.) of XIAMETER® OFS-0772 SILICONATE (supplied at a concentration of 30 percent solids in water, available from Dow Corning, Midland, Mich.)

Mix chemical reactants manually in 5 gallon (18.9 L) bucket, Measure and record the pH of the siliconate solution.

Transfer mixed chemical reactant material into a clean shot tank for the CoriMix® equipment. Close the reagent addition valve on the mixer, and set the liquid flow rate for 15 psi (103.42 kPa) by adjusting the air pressure of the tank.

Adjust the agitator speed to 3000 rpm. Once the speed is set, start the mixer on the control panel. Set the starch flow rate on the CoriMix® for 3.25 lb. (1.47 kg)/min. Start the starch control feeder and open the liquid control valve immediately. In one embodiment, a quantity of the starch added to the mixer via the starch control feeder may be mixed prior to adding the siliconate and/or acid from the shot tank. Take a sample of the starch/siliconate mixture during siliconate addition. Measure and record the pH of a slurry made with 20% starch obtained from the sample.

Check to see if the sample starch/siliconate sample withdrawn from the mixer is sufficiently mixed so as to be free flowing. Note that the starch is first dried down to a residual moisture of 9-13% as stated in the test procedure.

Check to see if the sample starch/siliconate sample withdrawn from the mixer is sufficiently mixed so as to be hydrophobic.

Once the addition of the siliconate and/or acid to the starch is complete and the starch/siliconate mixture is sufficiently mixed, turn off the mixer and feeder. Flush the shot tank and addition line with water. Open the control valve and add tap water to the shot tank. Adjust pressure to 20 psi (137.90 kPa). Collect water from the nozzle into an empty container.

Load the hydrophobic and/or free flowing starch into a feed hopper for pH adjustment. Set the starch rate, designated as 3.5 lbs. (1.47 kg.)/minute to be added from the feed hopper to the mixer.

Prepare acid solution. In a hood, create a 5:1 mixture of water and hydrochloric acid. Transfer material into a clean shot tank for the CoriMix® equipment. Close the reagent addition valve on the mixer. Set the liquid flow rate to 20 psi (137.90 kPa) by adjusting the air pressure of the tank.

Adjust the agitator speed to 3000 rpm. Once the speed is set, start the mixer on the control panel Start the feeder and open the liquid control valve immediately. Take a sample after 2 minutes and stop the feeder, close the liquid control valve and turn off the mixer. Measure the pH of a slurry made with 20% starch obtained from the sample. Adjust pressure as needed to reach a final pH of 6.5, adding sufficient acid solution to reach desired pH endpoint. When the desired pH endpoint is reached and all hydrophobic starch has been pH adjusted, turn off the mixer.

Results utilizing the starch mixture of Example 6 are shown in TABLE 1. TABLE 1 further describes several hydrophobic mixes made from MELOJEL® starch, a commercially available dent corn starch, utilizing various siliconate treatment percentages and siliconate ratios to yield hydrophobic starch mixes of the present invention. Of note, adjusting for mechanical failures (e.g. nozzle clogging), all samples run at siliconate treatments of 8.4 and 12.6 exhibited hydrophobicity as claimed herein, whereas samples run at a siliconate treatment of 4.2 with a water to siliconate ratio of at least 2:1 also exhibit hydrophobicity as claimed herein. While all hydrophobic starches are free flowing, not all free flowing starches were hydrophobic.

| Batch | Base | CoriMix® Speed (RPM) | Batch Size (kg) | Siliconate Solution Treatment ||| Siliconate Addition (kPa) | pH Adjustment through Acid Addition ||| pH | Water Repellency (ml) | Free Flow Diameter (cm) |
| | | | | Siliconate Solution Percentage (%) | Ratio (Water:Siliconate Solution) | Starch Feed Rate (kg/min) | | HCl Ratio (Water:Acid) | Starch Feed Rate (kg/min) | HCl addition (kPa) | | | |
|---|---|---|---|---|---|---|---|---|---|---|---|---|---|
| — | MELO JEL® | Not Treated ||| | Not Treated ||| | 11.1 | 5.3 |
| — | Tapioca Starch | Not Treated ||| | Not Treated ||| | 12.3 | 5.5 |
| DKP 43 | MELO JEL® | 3000 | N/A | 4.2 | 0:1 | 1.47 | 20.7 | 5:1 | 1.47 | 13.8 | 8.5 | 9.5 | 6.4 |
| EKP 9 | MELO JEL® | 3000 | N/A | 12.6 | 0:1 | 1.47 | 103.4 | 4:1 | 1.47 | 82.7 | 8.6 | 0.4 | 9.3 |
| DAP 36 | MELO JEL® | 3000 | 45.4 | 12.6 | 0:1 | 1.47 | 103.4 | 3:1 | 1.47 | 75.8 | 6.5 | 0.9 | 8.6 |
| DAP 37 | MELO JEL® | 3000 | 45.4 | 12.6 | 0:1 | 1.47 | 103.4 | 5:1 | 1.47 | 137.9 | 6.5 | 0.8 | 8.8 |
| EAP 8 | MELO JEL® | 3000 | 41.0 | 8.4 | 0:1 | 1.47 | 55.2 | 4:1 | Nozzle clogged || 11.5 | 0.9 (after siliconate) | 8.8 |
| EAP 9 | MELO JEL® | 3000 | 45.4 | 8.4 | 0:1 | 1.63 | 103.4 | 4:1 | Nozzle clogged || 10.5 | 1.8 | 8.2 |
| EAP 12 | Tapioca Starch | 3000 | 45.4 | 8.4 | 0:1 | 1.47 | 69.0 | 4:01 | 1.47 | 82.7 | 6.2 | 0.2 | 9.9 |
| HAP 17 | MELO JEL® | 3000 | 45.4 | 4.2 | 0:1 | 1.59 | 27.6 | 8:1 | — | — | — | 2.0 | 9.9 |
| HAP 18 | MELO JEL® | 3000 | 45.4 | 4.2 | 2:1 | N/A | N/A | 8:1 | — | — | — | 0.4 | 10.4 |
| HAP 19 | MELO JEL® | 3000 | 45.4 | 4.2 | 2:1 | 1.48 | 82.7 | 8:1 | 1.50 | 69.0 | 5.5 | 0.5 | 11.3 |
| HAP 22 | MELO JEL® | 3000 | 45.4 | 4.2 | 1:1 | 1.54 | 34.5 | 8:1 | 1.36 | 55.2 | 5.3 | 10.0 | 7.8 |
| JAP 13 | MELO JEL® | 3000 | 45.4 | 4.2 | 2:1 | 1.36 | 69.0 | 8:1 | 1.50 | 27.6 | 10.5 | 0.3 | 10.3 |
| JAP 14 | MELO JEL® | 3000 | 45.36 | 4.2 | 2:1 | 1.36 | 68.95 | 8:1 | 1.45 | 27.56 | 10.2 | 0.3 | 11.8 |

Example 7

Creation of a Hydrophobic Tapioca Starch (EAP-12)

This example demonstrates the creation of a product of the present invention from National Starch Tapioca Starch No. 52-2016, a commercially available tapioca starch.

Obtain 100 lbs. (45.35 kg.) of the base starch, and load the specified amount of base starch in the feed hopper.

Set the starch rate, designated as 3.25 lbs. (1.47 kg.)/minute to be added from the feed hopper to the mixer.

Prepare the chemical reagents to be used for addition to the shot tank. In a chemical hood, weigh out 8.4 lbs. (3.81 kg.) of siliconate solution in 5 gallon (18.9 L) bucket. Mix manually. Measure and record the pH of the siliconate solution.

Transfer chemical reagent material into a clean shot tank for the CoriMix® equipment. Close the reagent addition valve on the mixer, and set the liquid flow rate for 10 psi (68.95 kPa) by adjusting the air pressure of the tank.

Adjust the agitator speed to 3000 rpm. Once the speed is set, start the mixer on the control panel. Set the starch flow rate on the CoriMix® for 3.25 lb. (1.47 kg.)/min. Start the starch control feeder and open the liquid control valve immediately. In one embodiment, a quantity of the starch added to the mixer via the starch control feeder may be mixed prior to adding the siliconate and/or acid from the shot tank. Take a sample of the starch/siliconate mixture during siliconate addition. Measure and record the pH of a slurry made with 20% starch obtained from the sample.

Check to see if the sample starch/siliconate sample withdrawn from the mixer is sufficiently mixed so as to be free flowing.

Check to see if the sample starch/siliconate sample withdrawn from the mixer is sufficiently mixed so as to be hydrophobic.

Once the addition of the siliconate and/or acid to the starch is complete and the starch/siliconate mixture is sufficiently mixed, turn off the mixer and feeder. Flush the shot tank and addition line with water. Open the control valve and add tap water to the shot tank. Adjust pressure to 12 psi (82.74 kPa). Collect water from the nozzle into an empty container.

Load the hydrophobic and/or free flowing starch into a feed hopper for pH adjustment. Set the starch rate, designated as 3.5 lbs. (1.47 kg.)/minute to be added from the feed hopper to the mixer.

Prepare acid solution. In a hood, create a 5:1 mixture of water and hydrochloric acid. Transfer material into a clean shot tank for the CoriMix® equipment. Close the reagent addition valve on the mixer. Set the liquid flow rate to 20 psi (137.90 kPa) by adjusting the air pressure of the tank.

On the display panel, adjust the agitator speed to 3000 rpm. Once the speed is set, start the mixer on the control panel Start the feeder and open the liquid control valve immediately. Take a sample after 2 minutes and stop the feeder, close valve and the mixer. Measure the pH of a slurry made with 20% starch obtained from the sample. Adjust pH as needed to reach a final pH of 6.5. When the desired endpoint is reached, turn off the mixer.

Results utilizing the starch mixture of Example 7 are shown in TABLE 1. TABLE 1 further describes several hydrophobic starch mixtures made from commercially available dent corn starch, utilizing various siliconate treatment percentages and siliconate ratios to yield hydrophobic starch mixes of the present invention. Of note, adjusting for mechanical failures (e.g. nozzle clogging), all samples run at siliconate treatments of 8.4 and 12.6 exhibited hydrophobicity as claimed herein, whereas samples run at a siliconate treatment of 4.2 with a water to siliconate ratio of at least 2:1 also exhibit hydrophobicity as claimed herein. While all hydrophobic starches are free flowing, not all free flowing starches were hydrophobic.

While a number of embodiments of the present invention have been described, it is understood that these embodiments are illustrative only, and not restrictive, and that many modifications and/or alternative embodiments may become apparent to those of ordinary skill in the art. For example, any steps may be performed in any desired order (and any desired steps may be added and/or any desired steps may be deleted). Therefore, it will be understood that the appended claims are intended to cover all such modifications and embodiments that come within the spirit and scope of the present invention.

What is claimed is:

1. A method comprising the steps of:
   mixing a siliconate solution and a starch to form a siliconate solution/starch mixture,
      wherein the siliconate solution comprises a siliconate,
      wherein the siliconate percentage of the siliconate solution/starch mixture is at least 0.5%;
      wherein the total moisture of the siliconate solution/starch mixture is at least 5% and not greater than 50%;
      and sufficiently mixing the mixture to result in a hydrophobic starch mixture,
   wherein the hydrophobic starch mixture exhibits a hydrophobicity of no more than 1 ml as assessed by the following test: add 75 ml of water to a Goetz type centrifuge tube; add 5 g of the hydrophobic starch mixture; invert the centrifuge tube 10 times without causing splashing, where "invert" is intended to mean turning the tube upside down and then back to original position over a period of at least three seconds; allow the centrifuge tube to sit for 30 minutes; slowly invert the centrifuge tube 10 more times without splashing; allow the centrifuge tube to sit another 30 minutes; and record the volume of settled starch in the centrifuge tube.

2. The method of claim 1, further comprising mixing water with the siliconate solution and the starch to form a siliconate solution/starch mixture.

3. The method of claim 1 or 2, wherein the total moisture of the siliconate solution/starch mixture is at least 10% and not greater than 30%.

4. The method of claim 1 or 2 further comprising the step of
   Drying the hydrophobic starch mixture to result in a dried hydrophobic starch with a residual moisture content of 0-18% (w/w).

5. The method of claim 4, wherein the residual moisture content is from 7 to 14% (w/w).

6. The method of claim 1, wherein the dried hydrophobic starch exhibits a hydrophobicity of no more than 0.8 ml.

7. The method of claim 1 or 2, wherein the siliconate solution is comprised of a methyl siliconate salt.

8. The method of claim 1 or 2, wherein the hydrophobic starch mixture is free flowing, wherein the resultant starch mixture has a starch pile diameter of a least 10.0 cm when tested as set forth in Example 4.

9. A product prepared in accordance with the method of claims 1 or 2.

10. A method comprising the steps of:
    Mixing a siliconate solution and a starch to form a siliconate solution/starch mixture,
       wherein the siliconate solution comprises a siliconate,
       wherein the siliconate percentage of the siliconate solution/starch mixture is at least 0.5%;
       wherein the total moisture of the siliconate solution/starch mixture is at least 5% and not greater than 50%; and
    sufficiently mixing the mixture to result in a free-flowing starch mixture, wherein the resultant starch mixture has a starch pile diameter of at least 10.0 cm when tested as set forth in Example 4.

11. A product prepared in accordance with the method of claim 10.

* * * * *